(12) United States Patent
Killadi et al.

(10) Patent No.: US 10,547,510 B2
(45) Date of Patent: Jan. 28, 2020

(54) ASSIGNING NETWORK DEVICES

(71) Applicant: Hewlett Packard Enterprise Development LP, Houston, TX (US)

(72) Inventors: Srinivas Killadi, Bangalore (IN); Sree Vasthav Shatdarshanam Venkata, Bangalore (IN)

(73) Assignee: Hewlett Packard Enterprise Development LP, Houston, TX (US)

( * ) Notice: Subject to any disclaimer, the term of this patent is extended or adjusted under 35 U.S.C. 154(b) by 38 days.

(21) Appl. No.: 15/959,415

(22) Filed: Apr. 23, 2018

(65) Prior Publication Data
US 2019/0327147 A1 Oct. 24, 2019

(51) Int. Cl.
H04L 12/24 (2006.01)
H04L 12/26 (2006.01)
H04L 12/66 (2006.01)

(52) U.S. Cl.
CPC .......... H04L 41/0893 (2013.01); H04L 12/66 (2013.01); H04L 41/0668 (2013.01);
(Continued)

(58) Field of Classification Search
None
See application file for complete search history.

(56) References Cited

U.S. PATENT DOCUMENTS 6,856,591 B1 * 2/2005 Ma ..................... H04L 41/0631
370/216
9,268,590 B2 2/2016 Du et al.
(Continued)

FOREIGN PATENT DOCUMENTS

CN 101482829 7/2009

OTHER PUBLICATIONS

Cluster Across Multiple Data Centers, (Research Paper), Sep. 2, 2017, 4 Pgs.
(Continued)

*Primary Examiner* — Chi H Pham
*Assistant Examiner* — Vladislav Y Agureyev
(74) *Attorney, Agent, or Firm* — Hewlett Packard Enterprise Patent Department

(57) ABSTRACT

A network device is disclosed. The network device comprises a processor. The processor may be obtain information of devices that are connected to the network device and, together with the network device, form a cluster of network devices; obtain, for each network device in the cluster of network devices, a plurality of parameters indicative of the connectivity of the network devices with one another; assign, based on the plurality of parameters, a grouping structure, whereby each network device in the cluster of network devices is assigned to a group according to a common value of the parameters shared by the network device and other network devices in the group; and assign, based on the grouping structure, each network device in the cluster of network devices as either an active device or a backup device, each active device having a corresponding backup device. Each backup device may be in a group which has no overlap with the group of the corresponding active device. A computer-implemented method and a non-transitory machine-readable medium are also disclosed.

14 Claims, 5 Drawing Sheets

(52) U.S. Cl.
CPC ...... *H04L 43/0811* (2013.01); *H04L 41/0886* (2013.01); *H04L 41/12* (2013.01)

(56) References Cited

U.S. PATENT DOCUMENTS

| | | | |
|---|---|---|---|
| 9,306,801 B2 | 4/2016 | Yang et al. | |
| 2006/0146999 A1* | 7/2006 | Thompson | G06F 9/542 379/88.18 |
| 2011/0317703 A1* | 12/2011 | Dunbar | H04L 12/462 370/392 |
| 2013/0258839 A1* | 10/2013 | Wang | H04L 41/0668 370/221 |
| 2014/0281669 A1* | 9/2014 | DeCusatis | G06F 11/2005 714/4.11 |
| 2015/0312819 A1* | 10/2015 | Yang | H04W 36/023 370/331 |
| 2016/0050104 A1* | 2/2016 | Wackerly | H04L 41/12 370/220 |
| 2017/0118067 A1* | 4/2017 | Vedula | H04L 41/0668 |
| 2017/0293500 A1 | 10/2017 | Molina et al. | |
| 2018/0152357 A1* | 5/2018 | Natham | H04L 45/66 |
| 2019/0173757 A1* | 6/2019 | Hira | H04L 41/0893 |

OTHER PUBLICATIONS

Cluster Groups, (Research Paper), Feb. 10, 2015, 5 Pgs.
Introducing Dynomite—Making Non-Distributed Databases, Distributed, (Research Paper), Nov. 3, 2014, 14 Pgs.
Saravanan Moorthy, Cluster Manager, Technical Climb Webinar, (Research Paper), May 30, 2017, 59 Pgs.

* cited by examiner

ASSIGNING NETWORK DEVICES

BACKGROUND

In a networking environment, a client device may be connected to an access point (AP) within a network. The AP may be connected to and managed by a network controller, which may be a part of a network controller cluster. If a network controller were to fail, then a client device managed by the failed network controller can automatically be managed by a backup network controller within the network controller cluster. This process may be referred to as a failover.

BRIEF DESCRIPTION OF DRAWINGS

Examples will now be described, by way of non-limiting example, with reference to the accompanying drawings, in which.

DETAILED DESCRIPTION

Figure 1:
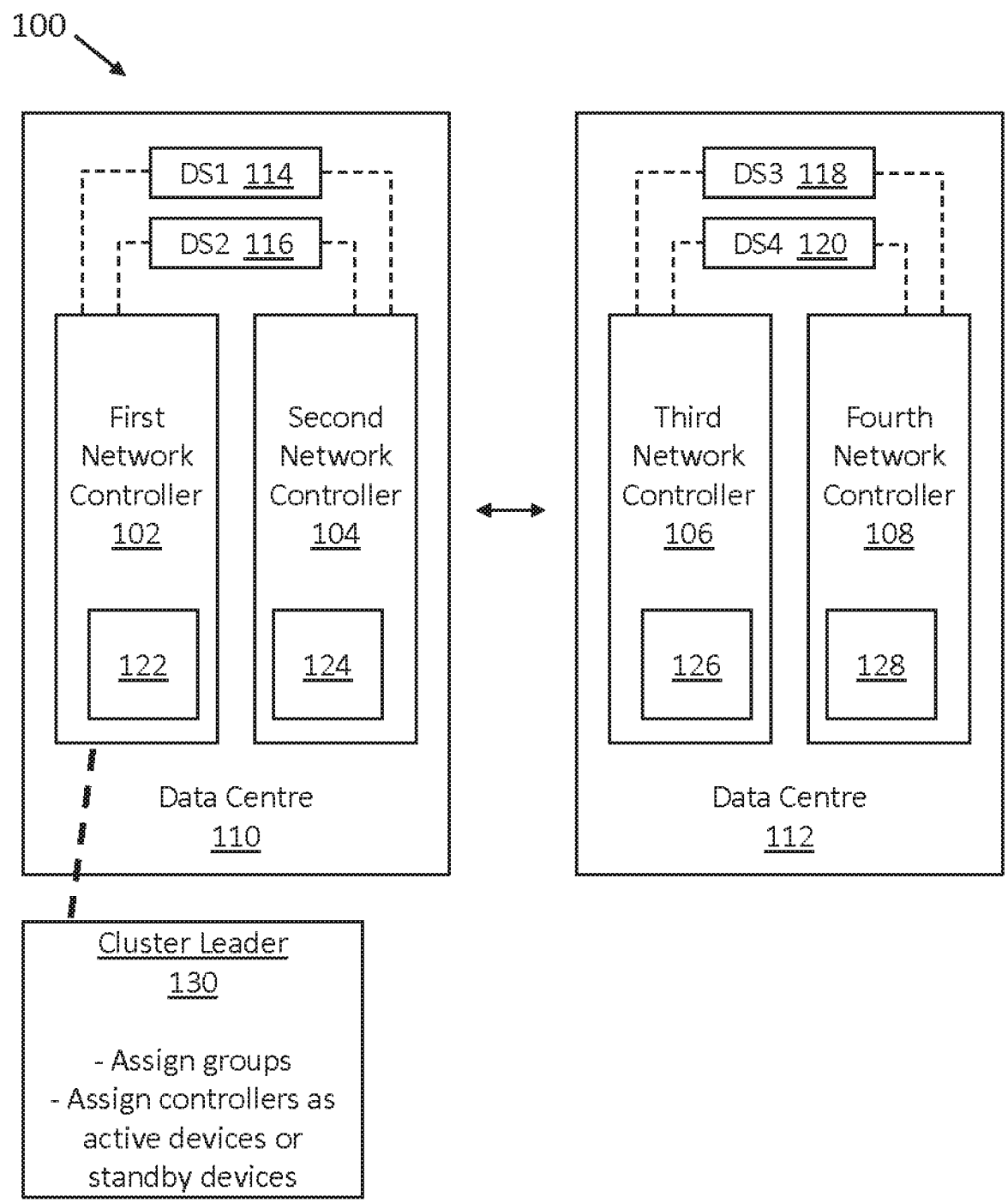
FIG. 1 is a schematic representation of an example of a cluster of network controllers.

Within a computing network, client devices may associate with an access point (AP). For example, a user may connect to the network by associating a client device, such as a desktop computer, laptop computer, tablet computer, smartphone, and the like, with an AP in the network. As used herein, a "network device" generally includes a device that is adapted to transmit and/or receive signalling and to process information within such signalling such as a station (e.g., any data processing equipment such as a computer, cellular phone, personal digital assistant, tablet devices, etc.), an access point, data transfer devices (such as network switches, routers, controllers, etc.) or the like. As used herein, an "access point" (AP) generally refers to receiving points for any known or convenient wireless access technology which may later become known. Specifically, the term AP is not intended to be limited to IEEE 802.11-based APs. APs generally function as an electronic device that is adapted to allow wireless devices to connect to a wired network via various communications standards.

Each AP may be managed by a network controller. A network controller may generally refer to a network device that is capable of managing a plurality of access points and client devices in a networking environment. For example, a network controller may manage multiple APs. The network controller may be a part of a network controller cluster. A network controller cluster may include a plurality of network controllers. In some examples, a network controller cluster may include between two and twelve network controllers. For example, a network controller cluster may be formed of four network controllers connected to one another. Within a network controller cluster, some network controllers may be designated to serve as active network controllers and others may be designated as standby (or redundant) network controllers with respect to an AP and/or a client device. Each standby network controller may serve as a backup for an active network controller within the network controller cluster. A network controller may serve as an active device with respect to a first AP or client device while serving as a backup device with respect to a second AP or client device. In the event that an active network controller were to fail (e.g. if power to the active network controller were to be cut), then any client devices connected to the network and managed by the failed active network controller would automatically be managed by its corresponding standby network controller, without the client device experiencing any loss in service. The process of the backup network controller taking over from the failed active network controller may generally be referred to as failover.

Each network controller in a network controller cluster may be housed within a data centre. In some examples, multiple network controllers of the network controller cluster may be housed within the same data centre. However, it is generally intended that an active network controller and its corresponding standby network controller are to be housed within different data centres so that, in the event that an entire data centre were to fail, an active network controller would still be able to failover to its corresponding standby network controller in a different data centre. Thus, client devices associated with an active network controller (e.g. via an AP) in a failed data centre should be able to seamlessly failover to the standby network controller housed within a different data centre. When a client device undergoes a seamless failover from a failed active network controller to its corresponding standby network controller, the client device does not become de-authenticated from the failed active network controller and should not, therefore, have to go through an authentication process with the standby network controller. From the point of the view of the client device, there may be little or no loss of connection during the failover, so switching to the standby network controller may appear seamless.

The network controllers may, in some examples, function as a User Anchor Controller (UAC) or an Access Point Anchor Controller (AAC). A network controller that functions as a UAC may handle traffic between an associated client device and the network controller, in some examples, the UAC may function so that, when a wirelessly-connected client device roams between multiple APs, the network controller remains within the same network controller cluster. A network controller that functions as an AAC may handle management functions for a particular AP. A network controller designated as a standby controller for a UAC may generally be referred to as a Standby User Anchor Controller (S-UAC), and a network controller designated as a standby controller for an AAC may generally be referred to as a Standby Access Point Anchor Controller (S-AAC).

Examples disclosed herein provide a mechanism by which network controllers in a network controller cluster may be assigned as active network controllers and standby network controllers using an intelligent assignment approach, so that network controller assigned as a standby network controller is in a different data centre than the network controller assigned as its corresponding active network controller. This is achieved by the methods and apparatus disclosed herein by taking into account various parameters associated with the network controllers in the network controller cluster. The network controllers are allocated into groups based on the parameters, and the assignment of active network controllers and standby network controllers is made based on the grouping.

Referring to the drawings, FIG. 1 is a schematic representation of a cluster 100 of network devices, or network controllers. In this example, the network controller cluster 100 includes a first network controller 102, a second network controller 104, a third network controller 106 and a fourth network controller 108. It will be appreciated that, in other examples, the network controller cluster 100 may include a different number (e.g. more or fewer) of network controllers. In the example shown in FIG. 1, the network controllers are housed in two data centres; a first data centre 110 houses the first network controller 102 and the second network controller 104, and a second data centre 112 houses the third network controller 106 and the fourth network controller 108.

The network controllers 102 to 108 within the network controller cluster 100 may be connected to one another according to a layer of the 7-layer Open Systems Interconnection (OSI) model of computer networking. Network controllers 102 to 108 within the network controller cluster 100 may communicate with one another, for example using the data link layer. Such communications may generally be referred to as layer 2, or L2 communications. Within the data link layer, data may be transferred between adjacent network nodes in the same wide area network (WAN) or between nodes in the same local area network (LAN). For example, the network controllers 102, 104, 106, 108 in FIG. 1 may be L2-connected. In some examples, network controllers may communicate with one another using the network layer. Such communications may generally be referred to as layer 3, or L3 communications. Within the network layer, data may be transferred between nodes in the same network, or in different networks, using variable-length network packets, which are routed through routers.

Within a data centre, each network controller may be connected to a distribution switch. In some examples, each network controller may be connected to a different distribution switch while, in other examples, multiple network controllers may be connected to a common distribution switch. Thus, a single data centre may include multiple distribution switches. In the example shown in FIG. 1, the first data centre 110 includes a first distribution switch (DS1) 114 and a second distribution switch (DS2) 116, and the second data centre 112 includes a third distribution switch (DS3) 118 and a fourth distribution switch (DS4) 120. It will, however, be appreciated that, in other examples, each data centre in a network controller cluster may include a different number of distribution switches. Dashed lines are used to indicate the possible connections between the network controllers and the distribution switches in each data centre 110, 112. For example, in the first data centre 110, one or both of the first network controller 102 and the second network controller 104 may be connected to the first distribution switch 114 or to the second distribution switch 116. In the second data centre 112, one or both of the third network controller 106 and the fourth network controller 108 may be connected to the first distribution switch 118 or to the second distribution switch 120.

Each network controller in the network controller cluster 100 comprises processing apparatus or processing circuitry to perform functions. For example, a processor of a network controller may receive configuration settings from a master controller, and configure the network controller according to the received settings. In the example shown in FIG. 1, the first network controller 102 comprises a first processor 122, the second network controller 104 comprises a second processor 124, the third network controller 106 comprises a third processor 126 and the fourth network controller 108 comprises a fourth processor 128. One network controller within a network controller cluster may be assigned as a cluster leader. The network controller assigned as the cluster leader has access to information relating to each network controller within the network controller. One task which be performed by the network controller assigned as the cluster leader is designating which network controllers within the cluster are to function as active network controllers and which are to function as standby network controllers. Furthermore, the cluster leader may designate which standby network controller is to serve as a backup to each active network controller within the network controller cluster. Methods disclosed herein may, in some examples, be performed using the processor of the network controller assigned as the cluster leader.

In the example shown in FIG. 1, the first network controller 102 is assigned as the cluster leader 130. Therefore, in this example, the first network controller 102 performs functions (for example using its processor 122) to designate network controllers within the network controller cluster 100 to function as active network controllers and standby network controllers with respect to the access points they manage. The designations are made based on various parameters relating to the connectivity of the network controllers to one another. The cluster leader 130 (e.g. the first network controller 102 in this example) may obtain the various network parameters from each of the network controllers in the network controller cluster 100, allocates the network controllers into groups according to the connectivity parameters, then assigns the network controllers in the network controller cluster as either active network controllers or standby network controller, based on the groups to which they have been allocated. These processes are discussed in greater detail below with reference to a network device which may, for example, comprise one of the network controllers 102, 104, 106, 108 of FIG. 1.

According to one aspect, a network device is disclosed. The network device (e.g. a network controller, such as the network controllers 102, 104, 106, 108) comprises a processor (e.g. a processor such as the processors 122, 124, 126, 128). The processor is to perform the methods disclosed herein. In some examples, the processor is to obtain information of devices that are connected to the network device and, together with the network device, form a cluster of network devices. With reference to the example of FIG. 1, the network device 102 may obtain information of the network devices 104, 106 and 108 that, together with the network device 102, form the network device cluster 100. The processor may be to obtain, for each network device in the cluster of network devices, a plurality of parameters indicative of the connectivity of the network devices with one another. For example, the network device 102 may obtain connectivity parameters for itself and for the other devices 104, 106, 108 in the network device cluster from a master controller (not shown) or by interrogating each device. In some examples, connectivity parameters for each network device may be stored in a storage device associated with the network device.

The processor may be to assign, based on the plurality of parameters, a grouping structure, whereby each network device in the cluster of network devices is assigned to a group according to a common value of the parameters shared by the network device and other network devices in the group. In some examples, an analysis of the connectivity parameters of each network device in the network device cluster may be performed, and those network devices having the same parameter values may be assigned to the same group. In some examples, two parameter values may be considered to be the same if the values are within a defined range of one another.

The processor of the network device may be to assign, based on the grouping structure, each network device in the cluster of network devices as either an active device or a backup device, each active device having a corresponding backup device. Each backup device is in a group which has no overlap with the group of the corresponding active device. Thus, each backup device is in a group which is different than the group in which the corresponding active device is allocated. By assigning the network devices such that there is overlap between the groups, a network device intended to function as a backup device will not be assigned to the same group as the network device intended to function as its corresponding active device. Therefore, if an active network device/controller is assigned to a first group, the corresponding standby or backup network device/controller is to be assigned to a second, different group.

By assigning each network controller to serve as an active device or a backup device based on the group to which the network controller has been assigned, the assignment of backup devices is done intelligently, taking into account connectivity parameters of the network controllers, so that network controllers are not assigned as backup devices within the same group as their corresponding active devices. In this way, an active device and its corresponding backup device will not be assigned within the same data centre and, therefore, if a data centre were to fail, then all of the active network controllers in that data centre would failover to their corresponding backup network controllers in another data centre or in other data centres.

In some examples, the parameters obtained for each network device may comprise a gateway media access control (MAC) address associated with each network device in the cluster. The gateway MAC address of a network controller or device is the address of the gateway to which traffic from the network controller is directed. If two network controllers share a common value for a gateway MAC address, it may be indicative that the two network controllers are housed within the same data centre. Thus, in some examples, assigning each network device to a group may be based on the extent to which network devices share the same gateway media access control address. For example, if two network devices share the same gateway MAC address, then they may be assigned to the same group.

In some examples, the parameters obtained for each network device may comprise information gathered using a Link Layer Discovery Protocol (LLDP). It can be determined from LLDP information whether network devices are connected to a common local area network (LAN) segment. Network devices that are connected to a common LAN segment may be considered to be LLDP neighbours. This may indicate, for example, that those network devices are connected to the same distribution switch, and this may indicate that the network devices are housed within the same data centre. In some examples, assigning each network device to a group may be based on the extent to which the LLDP information indicates that network devices are connected to a common local area network segment. For example, if LLDP information for two network devices indicates that they are connected to the same LAN segment, then they may be assigned to the same group.

In some examples, the parameters obtained for each network device may comprise a round-trip delay (RTD) time between pairs of network devices. In some examples, the round-trip delay time may be considered to be the length of time taken for a signal to be sent from a first network device to a second network device, plus the length of time taken for an acknowledgement of the signal to be received by the first network device. The signal may, for example, comprise a data packet. In some examples, the round-trip delay time may be referred to as a ping time. The time taken for a signal to travel between two network devices may be based on the physical distance between the network devices, for example. In some examples, assigning each network controller to a group may be based on the length of the round-trip delay time. A pair of network controllers which are connected within the same LAN segment may have a smaller round-trip delay time than a pair of network controllers which are located in different countries, for example. Thus, a relatively small round-trip delay time may be indicative that a pair of network controllers are housed within the same data centre. Therefore, the fact that a pair of network controllers have a relatively small round-trip delay time may contribute to them being assigned to the same group. In some examples, other connectivity parameters may be taken into account.

In some examples, all of the above-mentioned parameters may be taken into account when assigning the network controllers to groups. In other examples, one or two of the parameters may be taken into account. In some examples, the parameters may be weighted. In other words, some parameters may carry more weight (i.e. may be taken into account by a greater extent) than other parameters. In such examples, assigning the grouping structure may be based on the weighting of the parameters. For example, in an example where two network controllers share the same gateway MAC address, are connected to a common LAN segment and have a relatively small round-trip delay time, one of the parameters may be taken into account to a greater extent that the other parameters. In one example, the round-trip delay time may carry the greatest weight, the LLDP information may carry the next greatest weight, and the gateway MAC address may carry the lowest weight.

In some examples, a weighted mean of the parameters may be calculated. The parameters may, for example, be expressed in terms of numerical values. The weighted mean of the parameters may be used in some examples to assign each network device to a group and/or to assign each network device to serve as an active device or a backup device. For example, for the above example where three parameters are used to assign groups, the weighted mean may be calculated using:

$$W=(A\times\text{Parameter1}+B\times\text{Parameter2}+C\times\text{Parameter3})/3 \quad \text{(Equation 1)}$$

where W is the weighted mean, A, B and C are weights and Parameters 1, 2 and 3 are the parameters to be taken into account in assigning the network devices to groups. The weights A, B and C may be set depending on the importance of the respective parameters.

Figure 2:
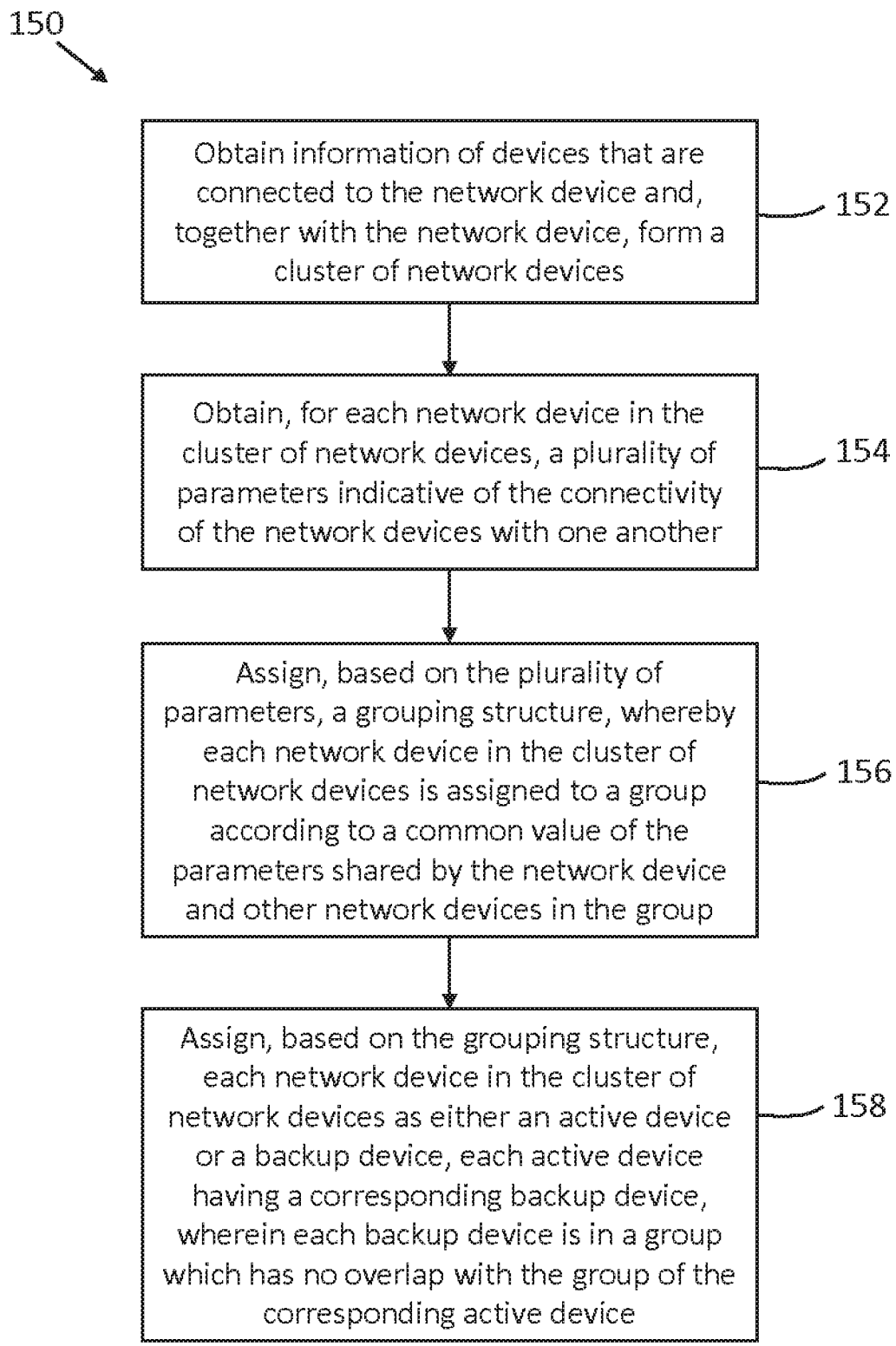
FIG. 2 is a flowchart of an example of a method of assigning network device.

FIG. 2 is a flowchart of an example of a method 150 performed by a network device 102 to 108, such as the cluster leader 130. The method 150 may comprise, at block 152, obtaining information of devices that are connected to the network device and, together with the network device, form a cluster of network devices. At block 154, the method 150 may comprise obtaining, for each network device in the cluster of network devices, a plurality of parameters indicative of the connectivity of the network devices with one another. The method 150 may comprise, at block 156, assigning, based on the plurality of parameters, a grouping structure, whereby each network device in the cluster of network devices is assigned to a group according to a common value of the parameters shared by the network device and other network devices in the group. At block 158, the method 150 may comprise assigning, based on the grouping structure, each network device in the cluster of network devices as either an active device or a backup device, each active device having a corresponding backup device, wherein each backup device is in a group which has no overlap with the group of the corresponding active device. The method 150 may be performed, for example, by the processor 122 to 128 of a network device or network controller 102 to 108.

Figure 3:
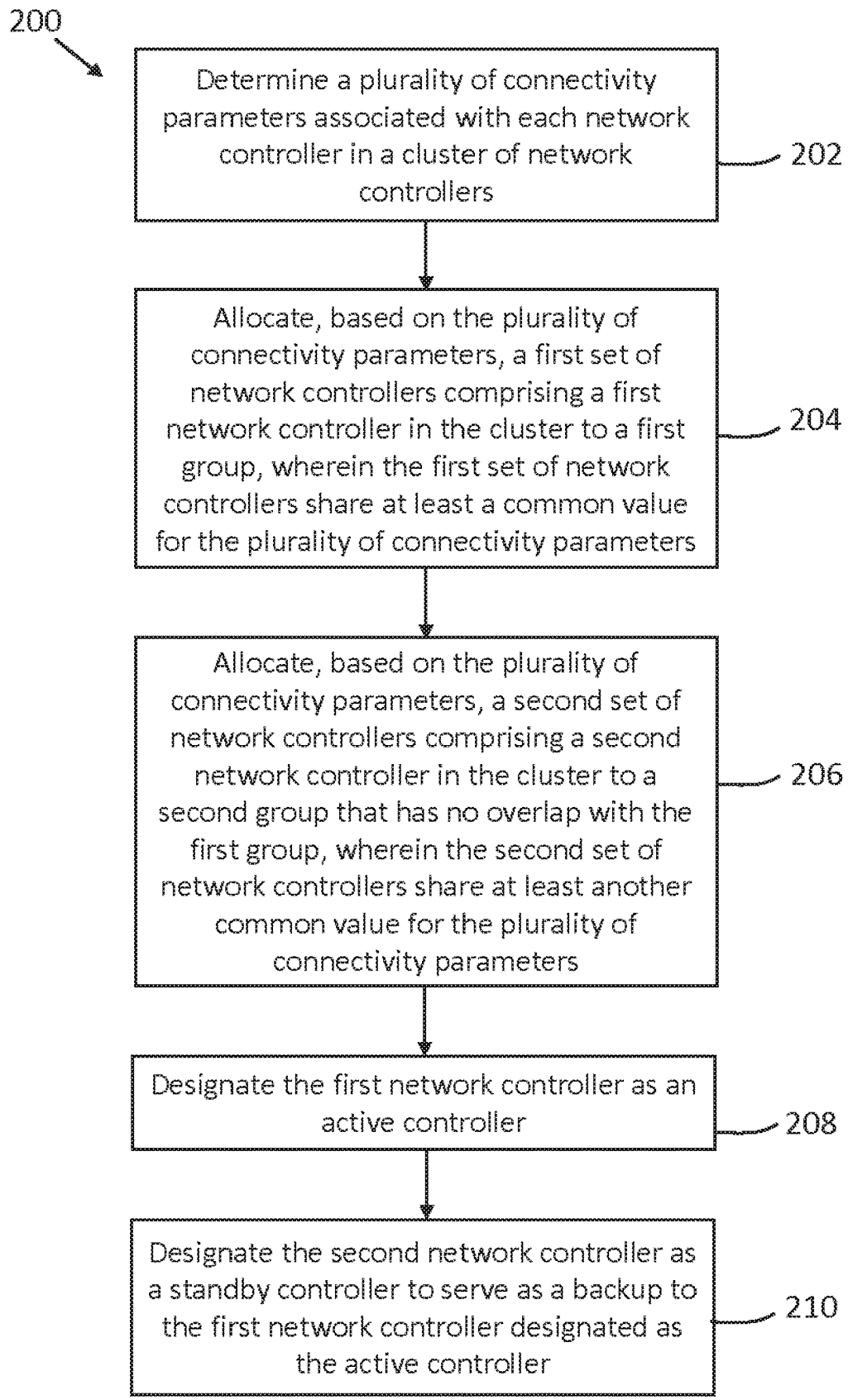
FIG. 3 is a flowchart of a further example of a method of assigning network devices.

According to another aspect, a further method is disclosed. The method may, for example, be a computer-implemented method, to be performed by suitable computer hardware. FIG. 3 is a flowchart of an example of a method 200. The method 200 may, for example, comprise a computer-implemented method of assigning network controllers. At block 202, the method 200 comprises determining a plurality of connectivity parameters associated with each network controller in a cluster of network controllers. The plurality of connectivity parameters may, for example, be determined by a processor of one of the network controllers in the network controller cluster, for example the cluster leader. As noted above, connectivity parameters may be obtained by interrogating each network controller, or by receiving the connectivity parameters from a master controller, for example.

The method 200 comprises, at block 204, allocating, based on the plurality of connectivity parameters, a first set of network controllers comprising a first network controller in the cluster to a first group, wherein the first set of network controllers share at least a common value for the plurality of connectivity parameters. At block 206, the method 200 comprises allocating, based on the plurality of connectivity parameters, a second set of network controllers comprising a second network controller in the cluster to a second group that has no overlap with the first group, wherein the second set of network controllers share at least another common value for the plurality of connectivity parameters. By allocating the network controllers such that the second group has no overlap with the first group, a network controller to be designated to function as a backup controller will not be allocated to the same group as the network controller to be designated to function as its corresponding active controller. Those network controllers which share a common value for a parameter (e.g. gateway MAC address) of the plurality of connectivity parameters may be allocated to the same group. In some examples, as noted above, network controllers sharing a common mean value (e.g. a weighted mean value) for a plurality of connectivity parameters may be allocated to the same group. In such examples, a network controllers may be considered to share a common value if their respective values are within a defined threshold of one another.

The method 200 comprises, at block 208, designating the first network controller as an active controller. At block 210, the method 200 comprises designating the second network controller as a standby controller to serve as a backup to the first network controller designated as the active controller. Thus, the controller designated as the active controller (i.e. the first network controller) is in a different group to the controller designated as the standby controller (i.e. the second network controller) which is to serve as a backup to the active controller. In this way, network controllers in a network controller cluster can be designated as active controllers and standby controllers such that a backup controller is housed in a different data centre than its corresponding active controller.

In some examples, the plurality of connectivity parameters may comprise a gateway media access control address associated with each network controller, information gathered using a Link Layer Discovery Protocol and/or a round-trip delay time between pairs of network controllers. Thus, in some examples, all of these connectivity parameters may be taken into account in the allocating (blocks 204 and 206) while, in other examples, fewer connectivity parameters may be taken into account.

The plurality of connectivity parameters may, in some examples, be weighted. In some examples, the allocation of each network controller to a group may be based on the weighting of the plurality of connectivity parameters. For example, the round-trip delay time parameter may be given the greatest weight (i.e. assigned a first priority), the LLDP information parameter may be given the next greatest weight (i.e. assigned a second priority), and the gateway MAC address parameter may be given the lowest weight (i.e. assigned the third priority).

By allocating the network controllers to groups based on the connectivity parameters, it is possible to designate active controllers and standby controllers in different data centres automatically, using the computer-implemented method, rather than doing so manually, for example with a human performing the designations. Thus, in some examples, the first set of network controllers allocated to the first group are within a first data centre and the second set of network controllers allocated to the second group are within a second, different data centre.

Figure 4:
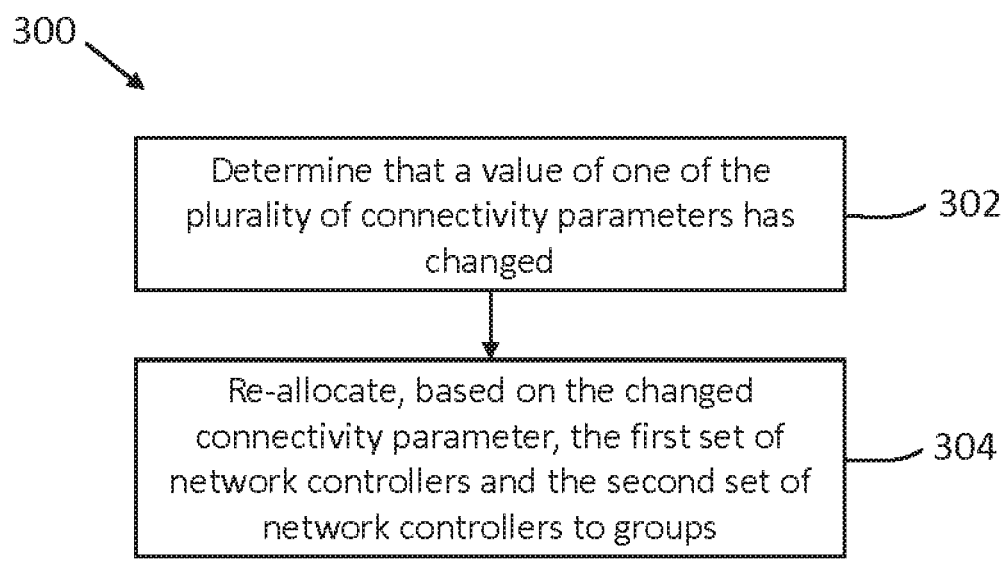
FIG. 4 is a flowchart of a further example of a method of assigning network devices.

The network controllers within a network controller cluster may, from time to time, change. For example, new network controllers may be added to a cluster and/or an existing network controller may be removed from a cluster. As a result, connectivity parameter values of network controllers within a network controller cluster may change after network controllers have been designated as active controllers and standby controllers. In some examples, allocations of network controllers in groups and/or designations of network controllers (i.e. as active controllers or standby controllers) may be changed if any connectivity parameters change. FIG. 4 is a flowchart of an example of a method 300 of assigning network controllers. The method 300 may comprise blocks of the method 200. In some examples, the method 300 may comprise, at block 302, determining that a value of one of the plurality of connectivity parameters has changed. At block 304, the method 300 may comprise re-allocating, based on the changed connectivity parameter, the first set of network controllers and the second set of network controllers to groups.

The allocation of groups is now discussed with reference to two examples (not shown in the drawings). In a first example, a network controller cluster includes four network controllers: Node A, Node B. Node C and Node D. Node A and Node B are housed within a first data centre, DC1, and are both connected to the same distribution switch, S1. Node C and Node D are housed within a second data centre, DC2, and are both connected to the same distribution switch, S2. In this example, connectivity parameters indicate that Node A and Node B are connected to a common LAN segment (e.g. from the LLDP information), and that Node A and Node B share a common gateway MAC address. Even though Node C may also share a common gateway MAC address with Node A, the connectivity parameters indicate that the RTD time between Node A and Node B is smaller than the RTD time between Node A and Node C. Connectivity parameters also indicate that Node C and Node D are connected to a common LAN segment and that Node C and Node D share a common gateway MAC address. Therefore, in this example, the computer-implemented method causes Node A and Node B to be grouped together, and Node C and Node D to be grouped together.

In a second example, a network controller cluster again includes four network controllers: Node A. Node B, Node C and Node D. As with the example above, Node A and Node B are housed within a first data centre, DC1, and Node C and Node D are housed within a second data centre, DC2. In this example, however. Node A is connected to a first distribution switch S1, Node B is connected to a second distribution switch 32, Node C is connected to a third distribution switch S3 and Node D is connected to a fourth distribution switch 34. Here, connectivity parameters indicate that Node A and Node B are not connected to a common LAN segment. However, the RTD time between Node A and Node B is smaller than the RTD time between Node A and Node C or between Node A and Node D. Therefore, in this example, the computer-implemented method causes Node A and Node B to be grouped together, and Node C and Node D to be grouped together.

Figure 5:
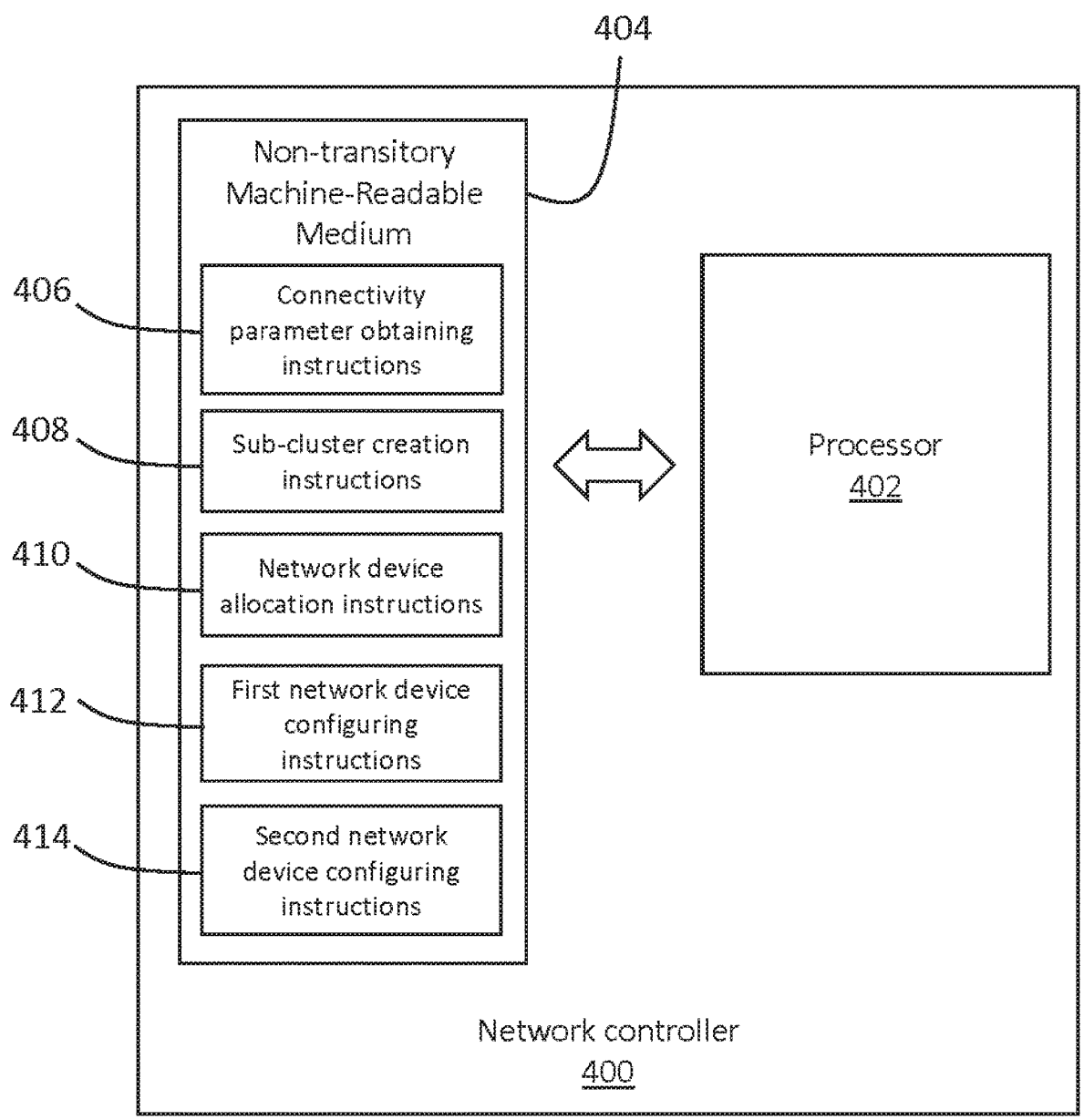
FIG. 5 is a schematic representation of an example of a network device.

According to another aspect, a non-transitory machine-readable medium is disclosed. FIG. 5 is a simplified schematic of an example of a processor 402 and a non-transitory machine-readable medium 404. As shown in FIG. 5, the non-transitory machine-readable medium 404 and the processor 402 may form part of a network controller 400. The non-transitory machine-readable medium 404 comprises instructions which, when executed by the processor 402, cause the processor to perform the methods disclosed herein. In some examples, the non-transitory machine-readable medium 404 comprises instructions (e.g. connectivity parameter obtaining instructions 406) which, when executed by the processor 402, cause the processor to obtain a plurality of connectivity parameters associated with each network device in a cluster of network devices. For example, the network devices may comprise the network controllers discussed above. The non-transitory machine-readable medium 404 may, in some examples, comprise instructions (e.g. sub-cluster creation instructions 408) which, when executed by the processor 402, cause the processor to create a plurality of sub-clusters, wherein the plurality of sub-clusters have no overlap members, and wherein members in each sub-cluster share at least a common value of the connectivity parameters. A sub-cluster may comprise a group as described above. In some examples, the non-transitory machine-readable medium 404 may comprise instructions (e.g. network device allocation instructions 410) which, when executed by the processor 402, cause the processor to allocate, based on a value of the connectivity parameters corresponding to each network device, each network device to a sub-cluster of the plurality of sub-clusters. The non-transitory machine-readable medium 404 may, in some examples, comprise instructions (e.g. first network device configuring instructions 412) which, when executed by the processor 402, cause the processor to configure a first network device in a first sub-cluster as an active anchor controller. In some examples, the non-transitory machine-readable medium 404 may comprise instructions (e.g. second network device configuring instructions 414) which, when executed by the processor 402, cause the processor to configure a second network device in a second sub-cluster as a standby anchor controller to serve as a backup controller to the first network device.

In this way network devices may be configured as active anchor controllers and standby anchor controllers in such a way that a standby anchor controller is in a different data centre than its corresponding active anchor controller. Thus, if a data centre housing an active anchor controller were to go down, then any client devices managed by the active anchor controller may seamlessly failover to the standby anchor controller housed in a difference data centre.

In some examples, the plurality of connectivity parameters comprise a gateway media access control (MAC) address associated with each network device, information gathered using a Link Layer Discovery Protocol (LLPD) and a round-trip delay (RTD) time between pairs of network devices.

Examples in the present disclosure can be provided as methods, systems or machine readable instructions, such as any combination of software, hardware, firmware or the like. Such machine readable instructions may be included on a computer readable storage medium (including but is not limited to disc storage, CD-ROM, optical storage, etc.) having computer readable program codes therein or thereon.

The present disclosure is described with reference to flow charts and/or block diagrams of the method, devices and systems according to examples of the present disclosure. Although the flow diagrams described above show a specific order of execution, the order of execution may differ from that which is depicted. Blocks described in relation to one flow chart may be combined with those of another flow chart. It shall be understood that each flow and/or block in the flow charts and/or block diagrams, as well as combinations of the flows and/or diagrams in the flow charts and/or block diagrams can be realized by machine readable instructions.

The machine readable instructions may, for example, be executed by a general purpose computer, a special purpose computer, an embedded processor or processors of other programmable data processing devices to realize the functions described in the description and diagrams. In particular, a processor or processing apparatus may execute the machine readable instructions. Thus functional modules of the apparatus and devices may be implemented by a processor executing machine readable instructions stored in a memory, or a processor operating in accordance with instructions embedded in logic circuitry. The term 'processor' is to be interpreted broadly to include a CPU, processing unit, ASIC, logic unit, or programmable gate array etc. The methods and functional modules may all be performed by a single processor or divided amongst several processors.

Such machine readable instructions may also be stored in a computer readable storage that can guide the computer or other programmable data processing devices to operate in a specific mode.

Such machine readable instructions may also be loaded onto a computer or other programmable data processing devices, so that the computer or other programmable data processing devices perform a series of operations to produce computer-implemented processing, thus the instructions executed on the computer or other programmable devices realize functions specified by flow(s) in the flow charts and/or block(s) in the block diagrams.

Further, the teachings herein may be implemented in the form of a computer software product, the computer software product being stored in a storage medium and comprising a plurality of instructions for making a computer device implement the methods recited in the examples of the present disclosure.

While the method, apparatus and related aspects have been described with reference to certain examples, various modifications, changes, omissions, and substitutions can be made without departing from the spirit of the present disclosure. It is intended, therefore, that the method, apparatus and related aspects be limited only by the scope of the following claims and their equivalents. It should be noted that the above-mentioned examples illustrate rather than limit what is described herein, and that those skilled in the art will be able to design many alternative implementations without departing from the scope of the appended claims. Features described in relation to one example may be combined with features of another example.

The word "comprising" does not exclude the presence of elements other than those listed in a claim, "a" or "an" does not exclude a plurality, and a single processor or other unit may fulfil the functions of several units recited in the claims.

The features of any dependent claim may be combined with the features of any of the independent claims or other dependent claims.

The invention claimed is:

1. A network device comprising:
    a processor to:
        obtain information of devices that are connected to the network device and, together with the network device, form a cluster of network devices;
        obtain, for each network device in the cluster of network devices, a plurality of parameters indicative of the connectivity of the network devices with one another, wherein the plurality of parameters comprise a round-trip delay time between pairs of network devices;
        assign, based on the plurality of parameters, a grouping structure, whereby each network device in the cluster of network devices is assigned to a group according to a common value of the parameters shared by the network device and other network devices in the group; and
        assign, based on the grouping structure, each network device in the cluster of network devices as either an active device or a backup device, each active device having a corresponding backup device,
    wherein each backup device is in a group which has no overlap with the group of the corresponding active device.

2. A network device according to claim 1, wherein the parameters are weighted; and
    wherein assigning the grouping structure is based on the weighting of the parameters.

3. A network device according to claim 1, wherein the parameters comprise a gateway media access control address associated with each network device in the cluster.

4. A network device according to claim 3, wherein assigning each network device to a group is based on the extent to which network devices share the same gateway media access control address.

5. A network device according to claim 1, wherein the parameters comprise information gathered using a Link Layer Discovery Protocol.

6. A network device according to claim 5, wherein assigning each network device to a group is based on the extent to which the LLDP information indicates that network devices are connected to a common local area network segment.

7. A network device according to claim 1, wherein assigning a network controller to a group is based on the length of the round-trip delay time.

8. A computer-implemented method comprising:
    determining a plurality of connectivity parameters associated with each network controller in a cluster of network controllers, wherein the plurality of parameters comprise a round-trip delay time between pairs of network devices;
    allocating, based on the plurality of connectivity parameters, a first set of network controllers comprising a first network controller in the cluster to a first group, wherein the first set of network controllers share at least a common value for the plurality of connectivity parameters;
    allocating, based on the plurality of connectivity parameters, a second set of network controllers comprising a second network controller in the cluster to a second group that has no overlap with the first group, wherein the second set of network controllers share at least another common value for the plurality of connectivity parameters;
    designating the first network controller as an active controller; and
    designating the second network controller as a standby controller to serve as a backup to the first network controller designated as the active controller.

9. A computer-implemented method according to claim 8, wherein the plurality of connectivity parameters comprise a gateway media access control address associated with each network controller, and/or information gathered using a Link Layer Discovery Protocol.

10. A computer-implemented method according to claim 8, wherein the plurality of connectivity parameters are weighted; and
    wherein the allocation of each network controller to a group is based on the weighting of the plurality of connectivity parameters.

11. A computer-implemented method according to claim 8, wherein the first set of network controllers allocated to the first group are within a first data centre and the second set of network controllers allocated to the second group are within a second, different data centre.

12. A computer-implemented method according to claim 8, further comprising:
    determining that a value of one of the plurality of connectivity parameters has changed; and
    re-allocating, based on the changed connectivity parameter, the first set of network controllers and the second set of network controllers to groups.

13. A non-transitory machine-readable medium comprising instructions which, when executed by a processor, cause the processor to:
    obtain a plurality of connectivity parameters associated with each network device in a cluster of network devices, wherein the plurality of parameters comprise a round-trip delay time between pairs of network devices;
    create a plurality of sub-clusters, wherein the plurality of sub-clusters have no overlap members, and wherein members in each sub-cluster share at least a common value of the connectivity parameters;
    allocate, based on a value of the connectivity parameters corresponding to each network device, each network device to a sub-cluster of the plurality of sub-clusters;
    configure a first network device in a first sub-cluster as an active anchor controller; and
    configure a second network device in a second sub-cluster as a standby anchor controller to serve as a backup controller to the first network device.

14. A machine-readable medium according to claim 13, wherein the plurality of connectivity parameters comprise a gateway media access control address associated with each network device, and information gathered using a Link Layer Discovery Protocol.

* * * * *